United States Patent
Berg

(10) Patent No.: US 12,420,498 B2
(45) Date of Patent: Sep. 23, 2025

(54) DEVICE AND METHOD FOR PRODUCING PREFORMS

(71) Applicant: Broetje-Automation GmbH, Rastede (DE)

(72) Inventor: Erik Berg, Oldenburg (DE)

(73) Assignee: Broetje-Automation GmbH, Rastede (DE)

( * ) Notice: Subject to any disclaimer, the term of this patent is extended or adjusted under 35 U.S.C. 154(b) by 289 days.

(21) Appl. No.: 17/639,128

(22) PCT Filed: Jun. 3, 2020

(86) PCT No.: PCT/EP2020/065311
§ 371 (c)(1),
(2) Date: Feb. 28, 2022

(87) PCT Pub. No.: WO2021/037405
PCT Pub. Date: Mar. 4, 2021

(65) Prior Publication Data
US 2022/0288876 A1 Sep. 15, 2022

(30) Foreign Application Priority Data

Aug. 30, 2019 (DE) ...................... 10 2019 123 384.4

(51) Int. Cl.
*B29C 70/50* (2006.01)
*B29B 11/16* (2006.01)
(Continued)

(52) U.S. Cl.
CPC .............. *B29C 70/50* (2013.01); *B29B 11/16* (2013.01); *B29C 70/545* (2013.01); *B29L 2031/3076* (2013.01)

(58) Field of Classification Search
CPC .......... B29C 70/08; B29C 70/46; B29C 70/50
(Continued)

(56) References Cited

U.S. PATENT DOCUMENTS

2005/0037195 A1\* 2/2005 Warek ...................... B29C 70/50
428/364
2016/0174681 A1\* 6/2016 Rehwinkel ............. A45D 31/00
264/40.7

FOREIGN PATENT DOCUMENTS

DE 10309806 10/2003
DE 60311453 3/2007
(Continued)

OTHER PUBLICATIONS

"German Search Report," for German Patent Application No. 102019123384.4 mailed Mar. 2, 2020 (4 pages).
(Continued)

*Primary Examiner* — Alison L Hindenlang
*Assistant Examiner* — Debjani Roy
(74) *Attorney, Agent, or Firm* — Pauly, DeVries Smith & Deffner LLC

(57) ABSTRACT

A device for producing preforms for aircraft structural components, wherein the device has a supply unit, which is designed to supply a layered structure having at least one material ply of a thermally activatable, flexible fiber composite material, together with a protective film arranged in each case on at least one outer side of the layered structure, wherein the device has at least one shaping unit, which is arranged downstream of the supply unit in a conveying direction and is designed to shape the layered structure supplied, wherein in that the layered structure, together with the respective protective film, can be fed to the shaping unit or to one of the shaping units with a cross-sectional profile with which the protective film or at least one of the protective films extends along a straight line.

15 Claims, 2 Drawing Sheets

(51) Int. Cl.
*B29C 70/54* (2006.01)
*B29L 31/30* (2006.01)

(58) Field of Classification Search
USPC ......... 264/257; 156/368, 356, 361, 441, 351
See application file for complete search history.

(56) References Cited

FOREIGN PATENT DOCUMENTS

| | | | |
|---|---|---|---|
| DE | 102008041832 | | 3/2010 |
| DE | 202013006605 | | 8/2013 |
| DE | 102013005539 | | 3/2014 |
| DE | 102013109477 | | 3/2015 |
| DE | 2016221917 | * | 5/2018 |
| EP | 1967354 | | 9/2008 |
| EP | 1995040 | | 11/2008 |
| EP | 1995042 | | 11/2008 |
| IL | 164075 | * | 12/2005 |
| KR | 101932635 | | 12/2018 |
| KR | 20170142457 | * | 12/2018 |
| WO | 2021037405 | | 3/2021 |

OTHER PUBLICATIONS

"International Preliminary Report on Patentability," for PCT Application No. PCT/EP2020/065311 mailed Mar. 10, 2022 (8 pages).
"International Search Report and Written Opinion," for PCT Application No. PCT/EP2020/065311 mailed Sep. 8, 2020 (8 pages).

* cited by examiner

DEVICE AND METHOD FOR PRODUCING PREFORMS

CROSS-REFERENCE TO RELATED APPLICATIONS

This application is a national stage application under 35 U.S.C. 371 of International Patent Application Serial No. PCT/EP2020/065311, entitled "Device and Method for Producing Preforms," filed Jun. 3, 2020, which claims priority from German Patent Application No. DE 10 2019 123 384.4, filed Aug. 30, 2019, the disclosure of which is incorporated herein by reference.

FIELD OF THE TECHNOLOGY

The disclosure relates to a device for producing preforms for aircraft structural components, to a method for producing preforms for aircraft structural components and to a preform.

BACKGROUND

Nowadays, the use of fiber-reinforced materials, referred to as fiber composite materials, is increasing sharply. This applies particularly to glass fiber-reinforced and carbon fiber-reinforced components (GRP or CFRP components), the use of which continues to increase owing to the steadily increasing demand for lightweight construction solutions. This applies especially to the aerospace industry and to the automotive industry.

The prior art (DE 603 11 453 T2), on which the disclosure is based, discloses a device for producing preforms for aircraft structural components in which a supply unit is equipped with a plurality of rolls, which each carry a wound-up material ply of a thermally activatable, flexible fiber composite material. The fiber composite material is a fiber material impregnated with a reaction resin, for example a glass fiber material or carbon fiber material, which is also referred to as a prepreg. In this prior art, the respective material ply is provided on both sides with a protective film, which is intended to prevent sticking of radially adjacent sections of the wound-up material ply. The rolls are unwound in the supply unit, the protective films on the two sides of the respective material ply being pulled off while still in the supply unit. The material ply thus freed from the protective films is then fed to a shaping unit, in which the respective material ply, in this case together with further material plies, is shaped. After shaping, the material plies are then heated, pressed and post-cured.

To ensure that during heating and pressing, which is carried out in a hot pressing device, liquefying reaction resin cannot adhere to the pressing molds, in this prior art a separate protective film is arranged between the material to be pressed and the respective pressing mold. For this purpose, two separate protective film feed units are provided, of which one feeds in a lower protective film before the material plies enter the shaping unit and another feeds in an upper protective film after the shaped material plies have emerged from the shaping unit. The lower and upper protective films are then pulled off again in each case after the heating and curing. The supply, handling and disposal of all the protective films mentioned leads to increased production costs in the production of preforms.

SUMMARY

The problem addressed by the disclosure is that of configuring and developing the known device in such a way that the production of preforms is simplified.

The above problem is solved by the features described herein.

The essential element is the basic idea of using a protective film, which is in any case already connected to the respective material ply on delivery of the latter and which protects the respective material ply until it is used in the device proposed and, in particular, during winding up to form a roll, also in subsequent process steps in the production of preforms. In the further process steps, in which a layered structure with at least one such material ply is shaped and, in particular, heated, it is possible in this way to prevent adhesion of reaction resin to parts of the plant in a simple manner. In particular, it is not necessary for this purpose to provide separate protective films which have to be fed in by means of respective dedicated protective film feed units and which have to be additionally disposed of.

More specifically, it is proposed that the layered structure, together with the respective protective film, can be fed to the shaping unit or to one of the shaping units with a cross-sectional profile with which the protective film or at least one of the protective films extends along a straight line. In the case where the device has a plurality of shaping units, the respective shaping unit is, in particular, the first and, if appropriate, the only transverse shaping unit in the conveying direction, which can also be, overall, the first shaping unit in the conveying direction. The layered structure and thus the respective protective film is therefore not yet preshaped but is straight, at least in the transverse direction, at the point in time immediately before shaping.

In various embodiments, the layered structure and thus the respective protective film extends along a straight line not only in cross section but also along a plane immediately before shaping. The layered structure and thus the respective protective film is thus not yet preshaped at this point in time in the conveying direction either, but is fed to the respective shaping unit as a flat strip. The "respective shaping unit" always refers to that shaping unit to which the layered structure, together with the respective protective film, can be fed with the cross-sectional profile with which the protective film or at least one of the protective films extends along a straight line.

According to various embodiments, a feed unit is provided, by means of which the layered structure is transported and can thus be passed through the respective shaping unit or all the shaping units and, where applicable, further processing units of the device. In this case, the feed unit, which is equipped in particular with a conveying drive and/or a one-part or multi-part conveying element comprising one or more transport rollers, transport belts or the like, is designed in such a way that during transport the respective protective film extends along said straight line and, in particular, along said plane in cross section.

Various embodiments relate to a heating unit, by means of which the layered structure can be heated before the respective shaping unit is reached. In this way, a reaction resin of the fiber composite material can be activated, i.e. liquefied for the purpose of optimum suitability for shaping. In the respective shaping unit and, if appropriate, one or more further shaping units, the layered structure can then already cool down and begin to cure.

According to various embodiments, the supply unit can also supply a multi-ply layered structure having at least two or more material plies of a thermally activatable, flexible fiber composite material. In this case, there can be no protective films within the layered structure, and therefore the material plies are in direct contact with one another. Provision can be made here for a plurality of material plies, for example two material plies, to be brought together in the supply unit, in which case, on the material ply side or sides which come into contact with an adjacent material ply as they are brought together, a protective film which may have been present beforehand is then pulled off before the material plies are brought together, or such a protective film is dispensed with from the outset on the respective material ply side. In all cases, such a multi-ply layered structure has a relevant protective film at least on one of its outer sides, such as on both outer sides, but can be free of protective films in its interior.

Various embodiments relate to a separating unit, which is arranged downstream of the respective shaping unit and which severs the shaped layered structure transversely to the conveying direction in order thereby to form preforms of a predetermined length.

Various embodiments relate to a post-curing unit, which is arranged downstream of the respective shaping unit and, in particular, also of the separating unit, and heats the layered structure again for the purpose of post-curing. Such a post-curing unit is, in particular, an autoclave.

According to various embodiments, a pull-off unit is provided, which is used to pull off the protective film or protective films which has/have extended along the respective straight line until the respective shaping unit has been reached. The pull-off unit can be arranged downstream of the respective shaping unit in the conveying direction, but it is also conceivable in principle to integrate such a pull-off unit into the shaping unit. Sections of the device at which the pull-off unit can pull the respective protective film off the layered structure are defined herein.

Various embodiments provide a method for producing preforms for aircraft structural components, in particular for use in a device according to the disclosure, in which a layered structure having at least one material ply of a thermally activatable, flexible fiber composite material, together with a protective film arranged in each case on at least one outer side of the layered structure, is supplied, in particular continuously, in a supply unit, and in which the layered structure supplied is shaped in at least one shaping unit arranged downstream of the supply unit in a conveying direction. According to the proposal, the layered structure, together with the respective protective film, is fed to the shaping unit or to one of the shaping units with a cross-sectional profile with which the protective film or at least one of the protective films extends along a straight line. Reference may be made to all the statements regarding the device according to the proposal.

Various embodiments of the fiber composite material which can be used in the method according to the proposal are defined herein.

Various embodiments of the protective film or protective films which can be used in the method according to the proposal are provided.

According various embodiments, until the respective shaping unit is reached, the layered structure is provided on one or both sides with a said protective film.

According to various embodiments, a preform is provided which is produced using a device according to the proposal and/or by a method according to the proposal.

Reference may be made to all the statements regarding the device according to the proposal and regarding the method according to the proposal.

Various embodiments provide a device for producing preforms for aircraft structural components, wherein the device has a supply unit, which is designed to supply a layered structure having at least one material ply of a thermally activatable, flexible fiber composite material, together with a protective film arranged in each case on at least one outer side of the layered structure, wherein the device has at least one shaping unit, which is arranged downstream of the supply unit in a conveying direction and is designed to shape the layered structure supplied, wherein the layered structure, together with the respective protective film, can be fed to the shaping unit or to one of the shaping units with a cross-sectional profile with which the protective film or at least one of the protective films extends along a straight line.

In various embodiments the layered structure, together with the respective protective film, can be fed to the respective shaping unit along a plane which extends, in particular, in the conveying direction, such as in such a way that the protective film or protective films, which extends/extend along the straight line until the respective shaping unit is reached, extends/extend along the plane.

In various embodiments, the device has a feed unit, in particular with a conveying drive and/or a one-part or multi-part conveying element, which is designed to transport the layered structure, together with the respective protective film, from the supply unit to the respective shaping unit with a cross-sectional profile with which the protective film or at least one of the protective films extends along a straight line.

In various embodiments, the feed unit is designed to transport the layered structure, together with the respective protective film, along a plane from the supply unit to the respective shaping unit, such as in such a way that the protective film or protective films, which extends/extend along the straight line until the respective shaping unit is reached, extends/extend along the plane.

In various embodiments, the device has a heating unit, which is arranged upstream of the respective shaping unit in the conveying direction and is designed to heat the layered structure, together with the respective protective film, as it is passed through the heating unit, such as to a temperature in a range from 100 to 160° C., to a temperature in a range from 110 to 150° C., or to a temperature in a range from 120 to 150° C.

In various embodiments, the supply unit is designed to supply the layered structure as a multi-ply layered structure having at least two or more material plies of a thermally activatable, flexible fiber composite material, together with a protective film arranged in each case on at least one outer side of the layered structure, wherein the material plies can be in direct contact with one another.

In various embodiments, the device has a separating unit, which is arranged downstream of the respective shaping unit in the conveying direction and is designed to sever the shaped layered structure transversely to the conveying direction and thereby to form preforms of a predetermined length.

In various embodiments, the device has a post-curing unit, in particular in the form of an autoclave, which is arranged downstream of the respective shaping unit, in particular also of the separating unit, in the conveying direction and is designed to heat the shaped and, in particular, severed layered structure, such as to a temperature in a range from 160 to 220° C., to a temperature in a range from 170 to 210° C., or to a temperature in a range from 170 to 200° C.

In various embodiments, the device has a pull-off unit, which is designed to pull off from the layered structure the protective film or protective films which has/have extended along the respective straight line until the respective shaping unit has been reached, such as all the protective films.

In various embodiments, the pull-off unit is designed to pull off the protective film or protective films which has/ have extended along the respective straight line until the respective shaping unit has been reached, such as all the protective films, in a section of the device which lies between the respective shaping unit or one of the shaping units and the separating unit in the conveying direction and/or which lies between the respective shaping unit or one of the shaping units and the post-curing unit in the conveying direction and/or which lies between the separating unit and the post-curing unit in the conveying direction or which is arranged downstream of the post-curing unit in the conveying direction.

Various embodiments provide a method for producing preforms for aircraft structural components, in particular for use in a device as described herein, in which a layered structure having at least one material ply of a thermally activatable, flexible fiber composite material, together with a protective film arranged in each case on at least one outer side of the layered structure, is supplied in a supply unit, and in which the layered structure supplied is shaped in at least one shaping unit arranged downstream of the supply unit in a conveying direction, wherein the layered structure, together with the respective protective film, can be fed to the shaping unit or to one of the shaping units with a cross-sectional profile with which the protective film or at least one of the protective films extends along a straight line.

In various embodiments, the fiber composite material of the at least one material ply comprises a fiber material which is impregnated with a reaction resin, wherein the fiber material comprises dry fibers, rovings, a woven fiber fabric, a non-crimp fabric, a fiber nonwoven and/or a braided fiber fabric and/or the reaction resin is a resin based on epoxy resin.

In various embodiments, the protective film or protective films which has/have extended along the respective straight line until the respective shaping unit has been reached, such as all the protective films, has/have a structured surface on its/their side which is assigned to contact with the layered structure.

In various embodiments, until the respective shaping unit is reached, the layered structure is provided on one or both outer sides with a protective film, wherein, until the respective shaping unit is reached, the protective films provided on both outer sides extend along the straight line and, in particular, along a plane which, in particular, extends in the conveying direction.

Various embodiments provide a preform produced using a device as described herein and/or produced by a method as described herein.

BRIEF DESCRIPTION OF THE DRAWINGS

Various aspects are explained below in greater detail with reference to a drawing, which illustrates just one exemplary embodiment. In the drawing.

DETAILED DESCRIPTION

Figure 1:
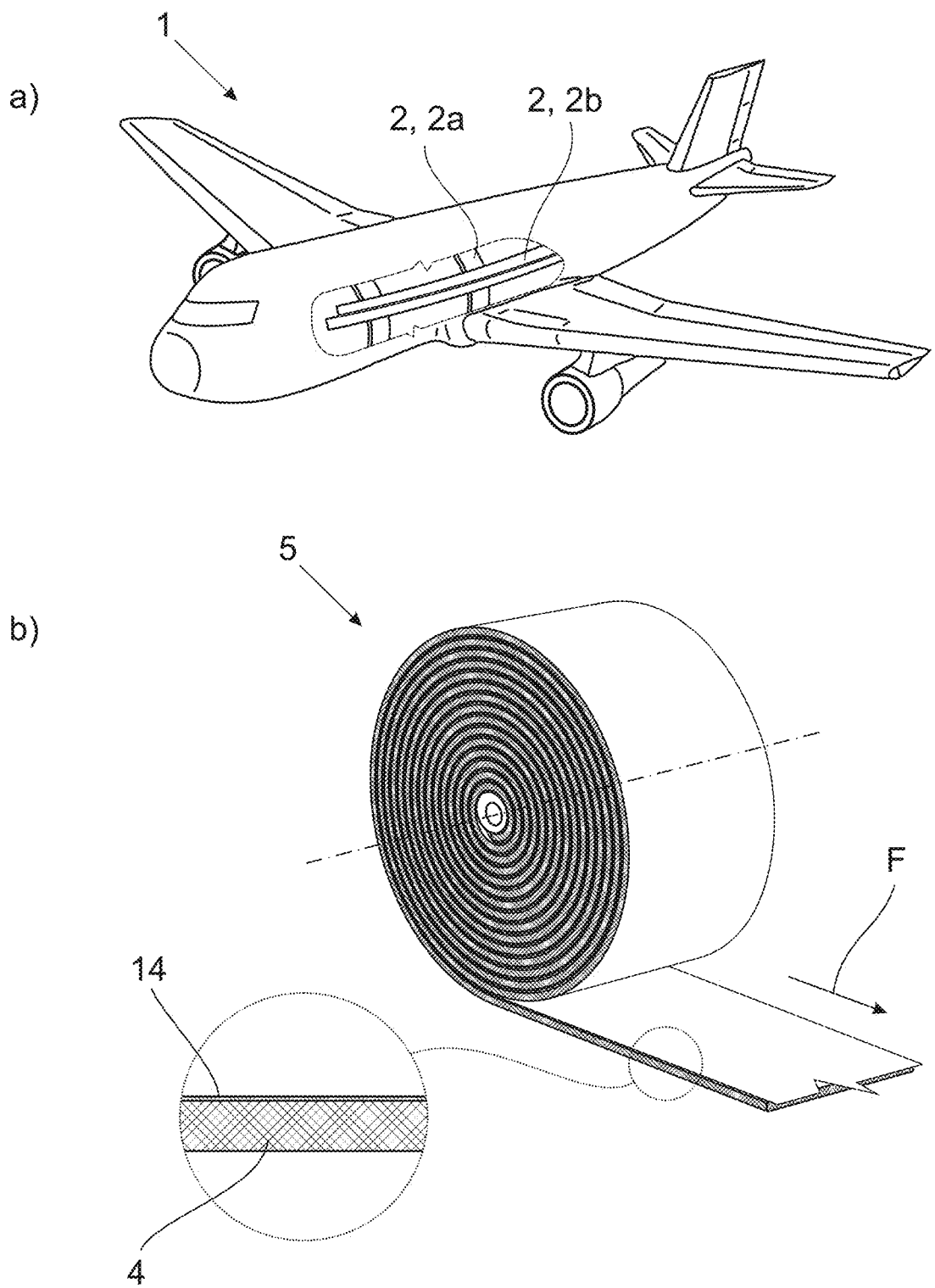
FIG. 1 shows, in a), a schematic three-dimensional illustration of an aircraft with an aircraft structural component produced using a preform according to the proposal, and in b) a schematic three-dimensional illustration of a material ply in the wound-up state for mounting in a supply unit of a device according to the proposal.

FIG. 1a) illustrates an aircraft 1 with aircraft structural components 2. In the cutaway in FIG. 1a), frames 2a and stringers 2b are shown by way of example as such aircraft structural components 2.

Nowadays, these aircraft structural components 2 are also produced as fiber-reinforced components. For this purpose, so-called preforms 3 are produced, which are then further processed to form the aircraft structural components 2, in particular by being joined to other preforms 3.

Figure 2:
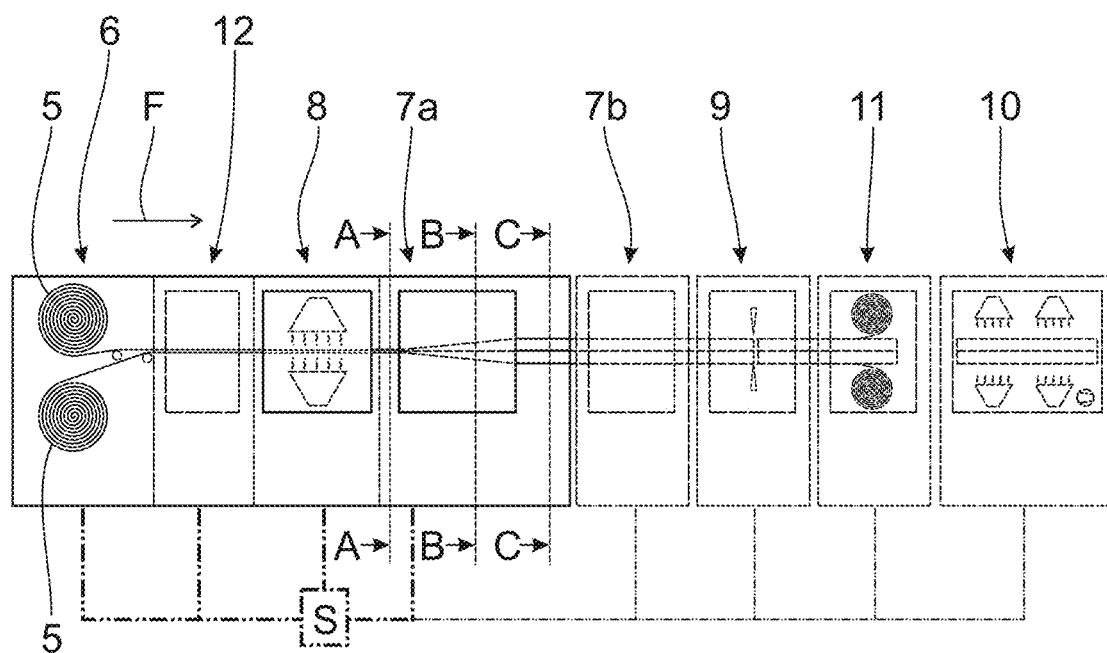
FIG. 2 shows a schematic illustration of the device according to the proposal and of the method according to the proposal for producing preforms according to the proposal.
Figure 2:
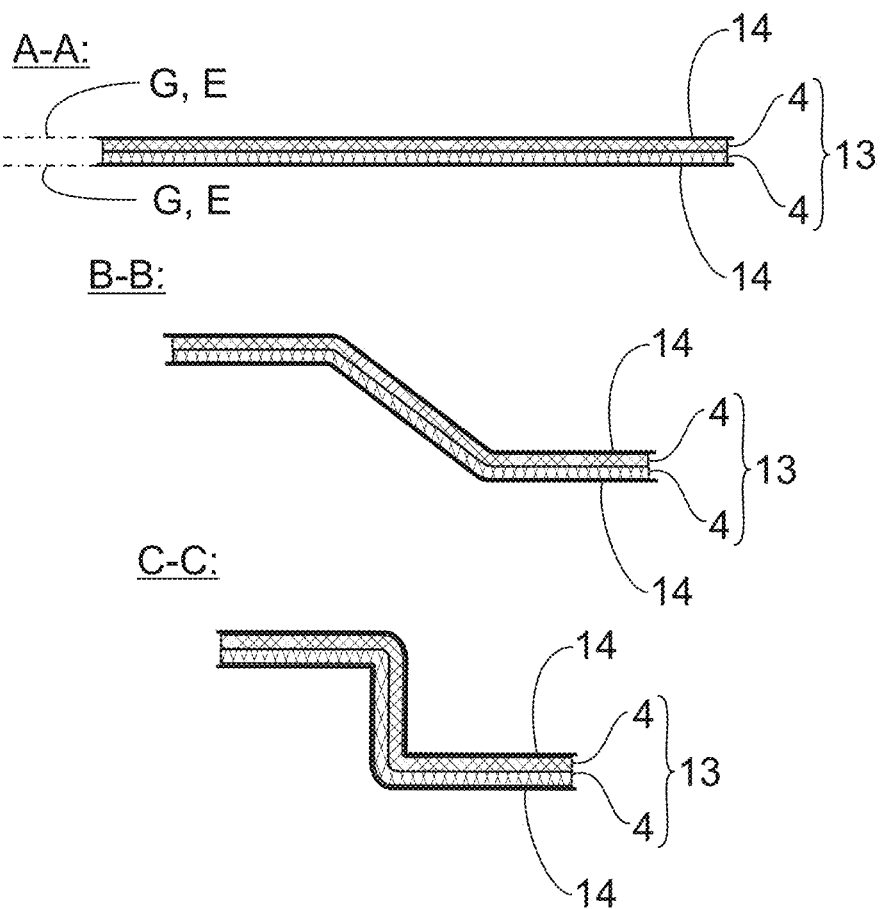

In FIG. 2, such a preform 3 is illustrated in cross section in section C-C. As can be seen here, such a preform 3 has at least one material ply 4, here two material plies 4, of a fiber composite material which, in each case in the unprocessed state, can be thermally activated and is/are designed to be flexible.

The fiber composite material of the respective material ply 4 comprises a fiber material, in particular CFRP or GRP, which is impregnated with a reaction resin. The fiber material in turn comprises, in particular, dry fibers, rovings, a woven fabric, a non-crimp fabric, a non-woven fabric and/or a braided fabric. Here, the reaction resin is an epoxy resin-based resin. Such a material ply of a fiber material and a reaction resin is also referred to as a prepreg. Here, the individual material plies 4 are delivered wound up as a roll 5 before being processed.

The at least one material ply 4, in this case the two material plies 4, are processed to give said preforms 3 by means of a device as illustrated schematically in FIG. 2 at the top. By means of this device and the method applied with it, preforms 3 can be produced with different cross-sectional profiles, here with a Z profile, as illustrated in section C-C in FIG. 2. The terms "cross section", "cross-sectional profile" and "transverse direction" always refer to a section transversely and, in particular, orthogonally to the conveying direction F. In principle, preforms 3 can also be produced in other profile shapes by such a device or by such a method, for example as an L, T, U or V profile.

The device illustrated schematically in FIG. 2 for producing preforms 3 for aircraft structural components 2 has various processing units, including at least one supply unit 6 and at least one shaping unit 7a, 7b. Here, the device also has, as processing units, a heating unit 8 and/or a separating unit 9 and/or a post-curing unit 10 and/or a pull-off unit 11. Various further processing units can also be provided, including, as here, a feed unit 12 for transporting the material plies 4 and a layered structure 13 formed therefrom, which feed unit can be provided with a conveying drive and/or a one-part or multi-part conveying element comprising, for example, one or more transport rollers, transport belts or the like. Individual processing units or all the processing units can be controlled by means of a control device S. The individual processing units will now be described in more detail below in the course of the description of the method for producing preforms 3 for aircraft structural components 2.

The supply unit 6 of the device is designed to supply a single- or multi-ply layered structure 13 having at least one material ply 4, in this case two material plies 4, of a thermally activatable, flexible fiber composite material of the kind described above, together with a protective film 14 arranged in each case on at least one outer side of the layered structure 13. Here, the material plies 4 and thus the layered structure 13 are supplied continuously. For this purpose, the supply unit 6 is loaded with at least one roll 5, in this case two rolls 5, each comprising a wound-up material ply 4. In principle, however, other types of delivery of a material ply 4 and the loading of the supply unit 6 with the material ply 4 are also conceivable.

The protective film 14 is a protective film which is already connected to an outer side of the respective material ply 4 when the respective material ply 4 is wound up to form the roll 5, in order to prevent unwanted adhesion of adjacent material plies 4 or radially adjacent material ply sections up to the point in time at which the supply unit 6 is loaded with the material ply or plies 4. It is also possible for each outer side of the respective material ply 4 to be equipped with such a protective film 14. The respective protective film 14, of which only one is provided here, is thus already connected to the material ply or plies 4 before the layered structure 13 is shaped.

Here, the protective film 14 or the protective films 14 have a structured surface, at least on its/their side which is assigned to contact with the layered structure 13.

As illustrated in the schematic view in FIG. 2 at the top, a plurality of material plies 4, in the exemplary embodiment two material plies 4, which are each provided on an outer side with a protective film 14, are here brought together in the supply unit 6 and then together form the layered structure 13, which is then fed to further processing, in particular in the shaping unit 7a, in the conveying direction F. In an alternative embodiment (not illustrated here), the layered structure 13 can also be formed from just one single material ply 4, that is to say it can be configured as a single-ply layered structure 13. The further statements regarding the layered structure 13, which has multiple plies, also apply equally to a single-ply layered structure 13.

In the device, at least one shaping unit 7a, which is a transverse shaping unit, by means of which the layered structure 13 is shaped into a predetermined cross-sectional profile, is arranged downstream of the supply unit 6 in the conveying direction F. The shaping process is illustrated by a combined view of sections A-A, B-B and C-C in FIG. 2. In addition, it is also possible to provide a longitudinal shaping unit, by means of which the layered structure 13 can be shaped around an axis oriented orthogonally to the conveying direction F, for example to produce a predetermined longitudinal curvature. Such a longitudinal shaping unit is shown here schematically as a further, optional shaping unit 7b and, here, is arranged downstream of the shaping unit 7a designed as a transverse shaping unit in the conveying direction F. The further statements regarding shaping unit 7a, which is here designed as a transverse shaping unit, apply equally to other shaping units and, in particular, also to the further shaping unit 7b, which here is optional and designed as a longitudinal shaping unit.

The essential point now is that the layered structure 13, together with the respective protective film 14, can be fed to the shaping unit 7a or to one of the shaping units 7a, 7b with a cross-sectional profile in which the protective film 14 or at least one of the protective films 14 extends along a straight line G. This shaping unit 7a, to which the layered structure 13 with said cross-sectional profile can be fed, is, as stated, a transverse shaping unit. In particular, this shaping unit is the first shaping unit in the conveying direction F. Since, here, the layered structure 13 is provided on both of its outer sides with a protective film 14, it is, here, such that the cross-sectional profile of the layered structure 13 is shaped in such a way that both protective films 14 extend in each case along a straight line G, as section A-A in FIG. 2 shows.

Here, as section A-A in FIG. 2 likewise shows, the situation is such that the layered structure 13, together with the respective protective film 14, can be fed to the shaping unit 7a along a plane E which extends, in particular, in the conveying direction F, such as in such a way that the protective film 14 or protective films 14, which extends/extend along the straight line G until the respective shaping unit 7a is reached, extends/extend along the plane E. The special alignment of the layered structure 13 immediately before it is subjected to an initial transverse shaping, i.e. the alignment in which the protective film extends along a straight line in cross section and, in particular, the protective film extends along a plane, is achieved here by a special design of the feed unit 12a. In addition to a conveying drive, the feed unit 12 has a one-part or multi-part transport element, in particular in the form of one or more transport rollers, transport belts or the like, wherein the arrangement of the individual parts or sections of the transport element, in particular the arrangement of the transport rollers, transport belts or the like, and their alignment with respect to one another are selected in such a way that, before the shaping unit 7a, the respective protective film 14 and, in particular, the layered structure 13 has not yet been transversely shaped in relation to the delivery state and, in particular, has not yet been shaped at all. The delivery state is the state of the material ply 4 and the protective film 14 at the point in time when supply unit 6 is loaded therewith.

Here, the feed unit 12 and, in particular, the individual parts or sections of the transport element, for example the transport rollers and/or the transport belts, are designed to transport the layered structure 13, together with the respective protective film 14, from the supply unit 6 to the respective shaping unit, in this case the first shaping unit 7a, with a cross-sectional profile in which the protective film 14 or at least one of the protective films 14, in this case both protective films 14, extends/extend along a straight line G. In some embodiments, the situation is such that the feed unit 12, and, in particular, the parts or sections of the transport element, is/are designed to transport the layered structure 13, together with the respective protective film 14, along a plane E from the supply unit 6 to the respective shaping unit 7a, in this case the first shaping unit 7a, such as in such a way that the protective film 14 or protective films 14, which extends/extend along the straight line G until the respective shaping unit 7a is reached, extends/extend along the plane E.

As already indicated above, the device here has a heating unit 8. Here, this heating unit 8 is arranged upstream of the respective shaping unit 7a, in particular of both shaping units 7a, 7b, and is designed to heat the layered structure 13, together with the respective protective film 14, as it is passed, in particular continuously, through the heating unit 8. The layered structure can be brought to a temperature in a range from 100 to 160° C., to a temperature in a range from 110 to 150° C., or to a temperature in a range from 120 to 150° C., over a part of its cross section or over its complete cross section. During this process, the respective protective film 14 remains aligned as described above, i.e. along a straight line G or along a plane E in cross section.

Here, as explained, the layered structure 13 can be supplied, in particular continuously, in the form of a multi-ply layered structure 13 having at least two, in this case exactly two, or even more, material plies 4 of a thermally activatable, flexible fiber composite material, together with a protective film 14 arranged in each case on at least one outer side of the layered structure 13. In this case, the material plies 4 are in direct contact with one another, that is to say no protective film is provided between respectively adjacent material plies 4. As stated, a protective film 14 is provided exclusively on at least one of the outer sides, in this case both outer sides, of the layered structure 13.

As likewise already explained, the device here has a separating unit 9 and/or a post-curing unit 10. Here, the separating unit 9 is arranged downstream of the respective shaping unit 7a, in particular of all the shaping units 7a, 7b, in the conveying direction F and is designed to sever the shaped layered structure 13, as illustrated in section C-C in FIG. 2, transversely to the conveying direction F and thereby to form the preforms 3 with a predetermined length. Here, the post-curing unit 10 is arranged downstream of the respective shaping unit 7a, in particular of all the shaping units 7a, 7b, in particular also of the separating unit 9, in the conveying direction F. The post-curing unit 10, which is configured, in particular, as an autoclave, is designed to heat the shaped and, in particular, severed layered structure 13 and thus the preforms 3 and thereby to post-cure them. In this case, the layered structure 13 or the respective preform 3 can be brought to a temperature in a range from 160 to 220° C., to a temperature in a range from 170 to 210° C., or to a temperature in a range from 170 to 200° C., over a part of its cross section or over its complete cross section.

Furthermore, as has likewise already been explained, a pull-off unit 11 is provided. This pull-off unit 11 is designed to pull off from the layered structure 13 the protective film 14 or protective films 14 which has/have extended along the respective straight line G until the respective shaping unit 7a has been reached, such as all the protective films 14. In principle, such a pull-off unit 11 can be arranged in sections of the device which are different with respect to the conveying direction F. In particular, the pull-off unit 11 is designed to pull off the respective protective film 14 in a section of the device which, as in the exemplary embodiment illustrated at the top in FIG. 2, is situated between the separating unit 9 and the post-curing unit 10 in the conveying direction F. However, the corresponding section of the device for pulling off the respective protective film 14 can also be situated between the respective shaping unit 7a or one of the shaping units 7a, 7b, in particular the last shaping unit 7b in the conveying direction F, and the separating unit 9 in the conveying direction F. Additionally or alternatively, provision can also be made for said section to be situated between the respective shaping unit 7a or one of the shaping units 7a, 7b, in particular the last shaping unit 7b in the conveying direction F, and the post-curing unit 10. It is also conceivable for said section to be arranged downstream of the post-curing unit 10 in the conveying direction F.

According to various embodiments, a method for producing preforms 3 for aircraft structural components 2, in particular for use in a device according to the proposal, is provided. In the method, a layered structure 13 having at least one material ply 4 of a thermally activatable, flexible fiber composite material, together with a protective film 14 arranged in each case on at least one outer side of the layered structure 13, is supplied, in particular continuously, in a supply unit 6. In the method, the layered structure 13 supplied is furthermore shaped in at least one shaping unit 7a, 7b arranged downstream of the supply unit 6 in the conveying direction F. The method according to the proposal is distinguished by the fact that the layered structure 13, together with the respective protective film 14, is fed to the shaping unit 7a or to one of the shaping units 7a, 7b with a cross-sectional profile in which the protective film 14 or at least one of the protective films 14 extends along a straight line G. Reference may be made to all the statements regarding the device according to the proposal.

herein various embodiments, for the at least one material ply 4, in this case the two material plies 4, to be delivered together with at least one protective film 14 arranged on at least one outer side of the respective material ply 4, and for the supply unit 6 to be loaded in this form. In particular, the respective material ply 4, together with the respective protective film 14 or the two protective films 14, is then in the state in which it is wound up to form a roll, with the supply unit 6 also being loaded in this form.

According to various embodiments, a preform 3 is provided which is produced using a device according to the proposal and/or by a method according to the proposal. Reference may be made to all the statements regarding the device according to the proposal and regarding the method according to the proposal.

The invention claimed is:

1. A device for producing preforms for aircraft structural components,
    wherein the device has a supply unit, which is designed to supply a layered structure having at least one material ply of a thermally activatable, flexible fiber composite material, together with a protective film arranged in each case on at least one outer side of the layered structure,
    wherein the device has at least one shaping unit, which is arranged downstream of the supply unit in a conveying direction and is designed to shape the layered structure supplied,
    wherein the layered structure, together with the respective protective film, can be fed to the shaping unit or to one of the shaping units with a cross-sectional profile with which the protective film or at least one of the protective films extends along a straight line, and wherein the layered structure, together with the respective protective film, is transversely shaped by the shaping unit into a predetermined non-planar cross-sectional profile; and
    wherein the device comprises a pull-off unit designed to pull off the protective film or protective films, which pull-off unit is arranged in conveying direction downstream of at least one of the shaping units.

2. The device as claimed in claim 1, wherein the layered structure, together with the respective protective film, can be fed to the respective shaping unit along a plane which extends in the conveying direction.

3. The device as claimed in claim 1, wherein the device has a feed unit, which is designed to transport the layered structure, together with the respective protective film, from the supply unit to the respective shaping unit with a cross-sectional profile with which the protective film or at least one of the protective films extends along a straight line.

4. The device as claimed in claim 1, wherein the device has a heating unit, which is arranged upstream of the respective shaping unit in the conveying direction and is designed to heat the layered structure, together with the respective protective film, as it is passed through the heating unit.

5. The device as claimed in claim 1, wherein the supply unit is designed to supply the layered structure as a multi-ply layered structure having at least two or more material plies of a thermally activatable, flexible fiber composite material, together with a protective film arranged in each case on at least one outer side of the layered structure.

6. The device as claimed in claim 1, wherein the device has a separating unit, which is arranged downstream of the respective shaping unit in the conveying direction and is designed to sever the shaped layered structure transversely to the conveying direction and thereby to form preforms of a predetermined length.

7. The device as claimed in claim 1, wherein the device has a post-curing unit, which is arranged downstream of the respective shaping unit in the conveying direction and is designed to heat the shaped and severed layered structure.

8. The device as claimed in claim 1, wherein the device has a pull-off unit, which is designed to pull off from the layered structure the protective film or protective films which has/have extended along the respective straight line until the respective shaping unit has been reached.

9. The device as claimed in claim 1, wherein the layered structure, together with the respective protective film, can be fed to the respective shaping unit along a plane which extends in the conveying direction, in such a way that the protective film or protective films, which extends/extend along the straight line until the respective shaping unit is reached, extends/extend along the plane.

10. The device as claimed in claim 1, wherein the device has a heating unit, which is arranged upstream of the respective shaping unit in the conveying direction and is designed to heat the layered structure, together with the respective protective film, as it is passed through the heating unit to a temperature in a range from 100 to 160° C.

11. The device as claimed in claim 1, wherein the device has a post-curing unit, which is arranged downstream of the respective shaping unit in the conveying direction and is designed to heat the shaped and severed layered structure, to a temperature in a range from 160 to 220° C.

12. The device as claimed in claim 3, wherein the feed unit is designed to transport the layered structure, together with the respective protective film, along a plane from the supply unit to the respective shaping unit.

13. The device as claimed in claim 3, wherein the feed unit is designed to transport the layered structure, together with the respective protective film, along a plane from the supply unit to the respective shaping unit, in such a way that the protective film or protective films, which extends/extend along the straight line until the respective shaping unit is reached, extends/extend along the plane.

14. The device as claimed in claim 5, wherein the material plies are in direct contact with one another.

15. The device as claimed in claim 8, wherein the pull-off unit is designed to pull off the protective film or protective films which has/have extended along the respective straight line until the respective shaping unit has been reached in a section of the device which lies between the respective shaping unit or one of the shaping units and the separating unit in the conveying direction and/or which lies between the respective shaping unit or one of the shaping units and the post-curing unit in the conveying direction and/or which lies between the separating unit and the post-curing unit in the conveying direction or which is arranged downstream of the post-curing unit in the conveying direction.

* * * * *